May 8, 1928.
J. G. MUELLER
ANIMAL TRAP
Filed Oct. 9, 1925
1,668,726
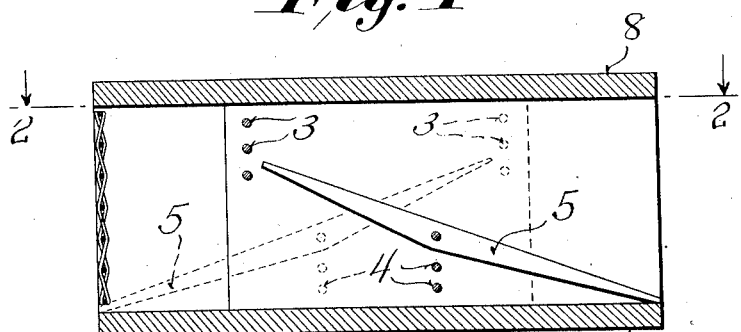
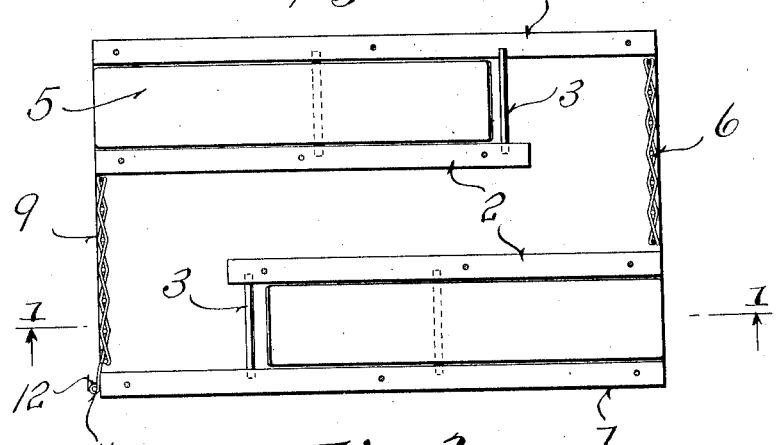
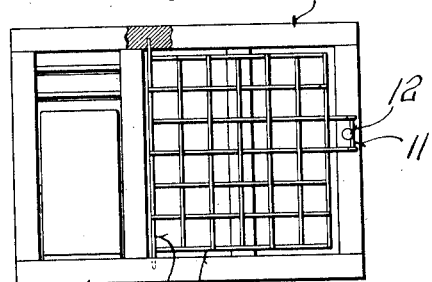

Patented May 8, 1928.

1,668,726

UNITED STATES PATENT OFFICE.

JOHN G. MUELLER, OF NEENAH, WISCONSIN.

ANIMAL TRAP.

Application filed October 9, 1925. Serial No. 61,449.

This invention relates to animal traps.

Objects of this invention are to provide a very simple and cheaply produced animal trap in which the several parts are held in interlocking engagement when the top and bottom are secured in place, and in which an extremely simple manner of mounting and latching the door is followed.

Further objects are to provide a trap which is not likely to get out of order, which is sure in its operation and which provides an entrance from either end with apparently an opening throughout the passageway, so that the animal will have no hesitancy in attempting to pass through the trap.

An embodiment of the invention is shown in the accompanying drawings, in which:—

Figure 1 is a vertical sectional view through the trap, such view corresponding to a section on the line 1—1 of Figure 2.

Figure 2 is a sectional view on the line 2—2 of Figure 1.

Figure 3 is an end view of the trap with parts broken away.

Referring to the drawings, it will be seen that the trap comprises a pair of side walls 1, and a pair of spaced intermediate walls 2 of lesser length than the side walls. A plurality of bars or similar form of grating 3 is provided at the upper portion of the trap adjacent the inner end of each of the intermediate walls 2, and it is to be noted particularly from Figure 2, that these bars are socketed in apertures formed in the side walls and in the intermediate walls. A similar arrangement of bars or grating members 4 is employed in the position shown in Figure 1. Above the grating bars 4 a pair of pivoted flaps 5 are positioned. These flaps are so arranged that their longer ends project towards the open end of the runways formed by the side walls and the intermediate walls, as shown particularly in Figure 2. It will be seen, therefore, that a runway is provided on each side of the trap and open at opposite ends.

The space between the outer ends of the intermediate walls and the outer walls is closed by means of an open work grating at each end. The grating 6 is preferably stationary and is secured in place by having its ends project into the top and bottom members 7 and 8 of the trap. The other grating member 9 is in reality a door and has one of its end bars 10 extended, as indicated in Figure 3, to provide a pintle pin which is loosely socketed in the top and bottom members 7 and 8 of the trap. Further, this grating or door has a pair of members projecting beyond its free edge and provided with a short tranverse member 11. This transverse member is adapted to latch beneath the head of a nail or similar fastener 12, as shown in Figures 2 and 3. Sufficient space is left between the ends of the outer gratings 6 and 9 and ends of the intermediate members 2 and also between the intermediate members 2 so as to accommodate the trapped animals.

The operation of the apparatus is obvious from the disclosure thus far given, for instance an animal approaching the trap will apparently see his way clear completely through the trap. He will, thereupon, enter one of the runways and proceed up the corresponding flap 5. When he passes the pivot point of the flap he will unbalance the flap and will pass into the enclosure in the trap. Thereafter, the flap 5 will immediately rock back into its initial position, as shown in Figure 1, and will cooperate with the gratings 4 and 3 to prevent egress of the animal. In emptying the trap, it is easy to unlatch the transverse bar 11 from the headed fastener 12.

It is to be noted that no springs are employed in this trap and further that the parts are held together in a very secure manner by socketing the projecting bars of the grating into the members of the trap, the top and bottom being securely nailed or otherwise fastened to the side members 1 and the intermediate members 2.

Although the invention has been described in considerable detail, it is to be understood that the invention may be variously embodied and is, therefore, to be limited only as claimed.

I claim:

In an animal trap, the combination of a body portion having upper and lower members and having a doorway, a gate for closing said doorway, said gate consisting of a plurality of horizontal and vertical rods forming a grating, one of the end vertical rods extending beyond the outline of the gate and forming integral trunnions, said upper and lower members having sockets for the reception of said trunnions, a pair of the horizontal members extending beyond the outline of the body portion of the gate and having a single transverse member at their ends, and a headed member carried by the body portion and adapted to be detachably engaged by said transverse member.

In testimony that I claim the foregoing I have hereunto set my hand at Neenah, in the county of Winnebago and State of Wisconsin.

JOHN G. MUELLER.